(12) United States Patent
Nguyen et al.

(10) Patent No.: US 6,699,424 B2
(45) Date of Patent: Mar. 2, 2004

(54) METHOD FOR FORMING THREE-DIMENSIONAL OBJECTS

(75) Inventors: Hop D. Nguyen, Quartz Hill, CA (US); Khalil M. Moussa, Stevenson Ranch, CA (US); Chris R. Manners, Moorpark, CA (US)

(73) Assignee: 3D Systems, Inc., Valencia, CA (US)

( * ) Notice: Subject to any disclaimer, the term of this patent is extended or adjusted under 35 U.S.C. 154(b) by 287 days.

(21) Appl. No.: 09/896,707

(22) Filed: Jun. 29, 2001

(65) Prior Publication Data

US 2003/0001312 A1 Jan. 2, 2003

(51) Int. Cl.⁷ .................. B29C 35/08; B29C 41/02; B29C 41/52
(52) U.S. Cl. ........................ 264/401; 264/40.1
(58) Field of Search ................ 264/40.1, 308, 264/401

(56) References Cited

U.S. PATENT DOCUMENTS

| 5,076,974 A | 12/1991 | Modrek et al. |
| 5,096,530 A | 3/1992 | Cohen |
| 5,104,592 A | 4/1992 | Hull et al. |
| 5,182,055 A | 1/1993 | Allison et al. |
| 5,238,639 A | 8/1993 | Vinson et al. |
| 5,273,691 A | 12/1993 | Hull et al. |
| 5,429,908 A | 7/1995 | Hokuf et al. |
| 5,562,929 A | 10/1996 | Asano |
| 5,932,059 A | 8/1999 | Langer et al. |
| 5,985,204 A | 11/1999 | Otsuka et al. |
| 6,399,010 B1 * | 6/2002 | Guertin et al. .............. 264/401 |

FOREIGN PATENT DOCUMENTS

EP 1 025 982 A2 8/2000

OTHER PUBLICATIONS

Internet Posting: 3D Online; Edge Online; Issue VII, Dec. 1999.
U.S. patent application No. 09/246,504 filed Feb. 8, 1999 by Bui et al. (now U.S. patent 6,399,010).

* cited by examiner

Primary Examiner—Leo B. Tentoni
(74) Attorney, Agent, or Firm—Ralph D'Alessandro

(57) ABSTRACT

A method of forming a three-dimensional object in layer-wise fashion by selectively solidifying a build material. The method solidifies the main part area, delays or pauses for a desired period of time to permit shrinkage to occur, and then, in multiple drawings of the main part borders, solidifies the borders from the portion closest to the main part outwardly to the portion farthest from the main part.

16 Claims, 2 Drawing Sheets

METHOD FOR FORMING THREE-DIMENSIONAL OBJECTS

BACKGROUND OF THE INVENTION

1. Field of the Invention

This invention relates generally to improvements in methods for forming three-dimensional objects from a fluid medium. More particularly, the invention relates to a new and improved stereolithography method involving the application of enhanced stereolithographic curing techniques to reproduce three-dimensional objects described by the input data design more accurately and economically from photocurable polymers.

2. Description of the Relevant Art

Stereolithography represents an expeditious way to quickly make complex or simple parts without conventional tooling. The basic stereolithographic process and apparatus to practice the process are described in U.S. Pat. No. 4,575,330 assigned to the assignee of the present invention. Since this technology depends on using a computer to generate its cross-sectional patterns, there is a natural data link to CAD/CAM. However, such systems have encountered difficulties relating to shrinkage, curl and other distortions, as well as resolution, accuracy and difficulties in producing certain object shapes.

Objects built using stereolithography have a tendency to distort from their CAD designed dimensions. This distortion may or may not appear in a specific object, based on how much stress is developed by the specific cure parameters and on the ability of the object to withstand stress. The stress that causes distortion develops when material that is being converted from liquid to solid comes into contact with and bonds to previously cured material. When material is converted from liquid to solid, it shrinks slightly. All stereolithography resins undergo shrinkage when cured. The shrinkage will vary with the type of resin, the temperature change as a result of rate of exposure, and other related factors. This shrinking causes stress and has two primary physical causes: (1) density of the liquid is less than that of the solid plastic; and (2) the chemical reaction that causes the change of state is strongly exothermic, causing the curing material to thermally expand and contract.

Certain sections of an object will be able to resist stresses without any apparent warp, that is where stress is at a tolerable level. On the other hand, other sections may distort considerably as the stress and structural strength balance each other. Since stress is caused by contact between curing material and cured material, it can be propagated along the entire length of contact between the curing line and cured material. Most contact of curing to cured material occurs from one layer to the next as opposed to along a single layer. This implies most distortions will be vertical in nature as opposed to horizontal. Further, large features in the XY plane tend to shrink more than smaller features in the XY plane. Since shrinkage is a fixed volumetric percentage, when a part transitions from a large feature to a small feature along the Z direction, the difference in shrinkage values produces a pronounced discontinuity on the external surface that is a geometric imperfection more commonly known as the differential shrinkage effect.

Differential shrinkage is more pronounced in parts transitioning from a large feature to a small or thin feature. The greater the difference in the sizes of the features, the greater is the differential shrinkage. Typically the object being built has its largest portion cured in what is known as a hatch or fill pattern. Prior techniques of curing the build parts have experienced the greatest shrinkage or distortion in the largest portion of the part where the hatching or fill typically occurs and not in the border layers. The main part area where the shrinkage occurs will have flaws and surface anomalies. Prior curing methods utilizing multiple border cures have cured the borders to these central or main part areas by curing outer border portions first and then curing successive boundary passes inwardly toward the central areas. This method leaves the final joining of the border to the central hatched or filled area with the surface flaws or anomalies in the central hatched or filled area uncorrected. This results in inaccurate reproductions of the input data in the 3-dimensional object being formed. Alternatively, directly joining the border to the central hatched or filled part area results in the borders being distorted as the curing of the central hatched or filled area continues due to shrinkage of the larger central or main part area. Further exacerbating the distortion problem with the advent of laser technology advancements is the increased use of higher power lasers to cure the photocurable material, resulting in faster curing and accelerated heat generation and heat build-up in the cured parts over less time. Attempts to compensate for this increased heat build-up require the use of lowered power and smaller spot size, both of which are counter to the benefits of the higher powered lasers faster speed and greater curing ability. Other attempts to compensate for this problem have used increased delay times between component curing to reduce the effects of part shrinkage and the concomitant part distortion resulting form that shrinkage. Discussions of the ability to perform this type of curing are described in U.S. Pat. Nos. 6,103,176 and 5,902,538, both assigned to the assignee of the present invention. Discussion of techniques to reduce differential shrinkage, including the use of a delay after exposure of at least a portion of a cross-section or lamina are presented in U.S. Ser. No. 09/246,504 filed Feb. 8, 1999 and assigned to the assignee of the present invention.

Therefore, there is a need for a technique to reduce differential shrinkage and distortion in parts fabricated using stereolithography without affecting the overall build or fabrication time by excessive or increased delay times to permit curing of components to occur.

BRIEF SUMMARY OF THE INVENTION

It is an aspect of the present invention that a method of producing stereolithographic parts is disclosed that uses a curing technique which reduces or controls differential shrinkage to an acceptable level in the building of parts.

It is another aspect of the present invention that shrinkage during the building of stereolithographic parts is controlled at the interface between the main hatched or filled part area and the part border.

It is a further aspect of the invention that delay time between component vectors and true CAD boundary scans to reduce shrinkage from resin or build material curing is minimized or eliminated.

It is a feature of the present invention that a build style is used that permits a sufficient delay period after curing the main hatched or filled area to permit shrinkage to occur and combines the delay period with attaching the part border directly to the hatched or filled area.

It is another feature of the present invention that the attaching of the part border directly to the hatched or filled area in successive boundary curing passes is accomplished from the nearest border area directly adjacent to the main hatched or filled area to the outside or furthest portion from the hatched or filled area.

It is yet another feature of the present invention that the technique can employ the use of both large and small laser beam spot sizes to cure both the hatched or filled main part areas and the border areas.

It is yet another feature of the present invention that the curing technique provides liquid photocurable material to fill all of the shrunken areas of the main hatched or filled area during the multiple boundary drawings.

It is still a further feature of the invention that supports for each component of a part are drawn between subsequent component vector scanning and true CAD boundary drawing.

It is still another feature of the present invention that the vector types which are drawn by the laser are ordered to reduce the delay time between component draws and concurrently accomplish as much build as possible and reduce or eliminate decreases in the overall stereolithography system throughput.

It is an advantage of the present invention that the stereolithographic method of curing the photocurable material reduces distortion in the final part and preserves the flatness and integrity of the part borders.

It is another advantage of the present invention that the curing of the border areas in multiple boundary drawings from the portion closest adjacent to the main part area to the portion furthest from the main part area reduces the surface anomalies and shrinkage in the final stereolithographic part.

It is yet another advantage of the present invention that the speed of the build of a stereolithographic part is not sacrificed to an unacceptable level to achieve reduced differential shrinkage in the part.

It is still another advantage of the present invention that the physical property of tensile elongation at break of the part is not reduced.

These and other aspects, features and advantages are achieved in the method of the present invention by pausing or delaying for a period of time after curing the main hatched or filled area of the part to permit shrinkage to occur and then curing the borders of the part adjacent the main hatched or filled area from the inside out in multiple boundary drawing passes to produce a part that is accurately reflective of the input data and with less distortion, but increased tensile elongation at break.

BRIEF DESCRIPTION OF THE DRAWING

These and other aspects, features, and advantages of the invention will become apparent upon consideration of the following detailed disclosure of the invention, especially when it is taken in conjunction with the accompanying drawings wherein.

DESCRIPTION OF THE PREFERRED EMBODIMENTS

Figure 1:
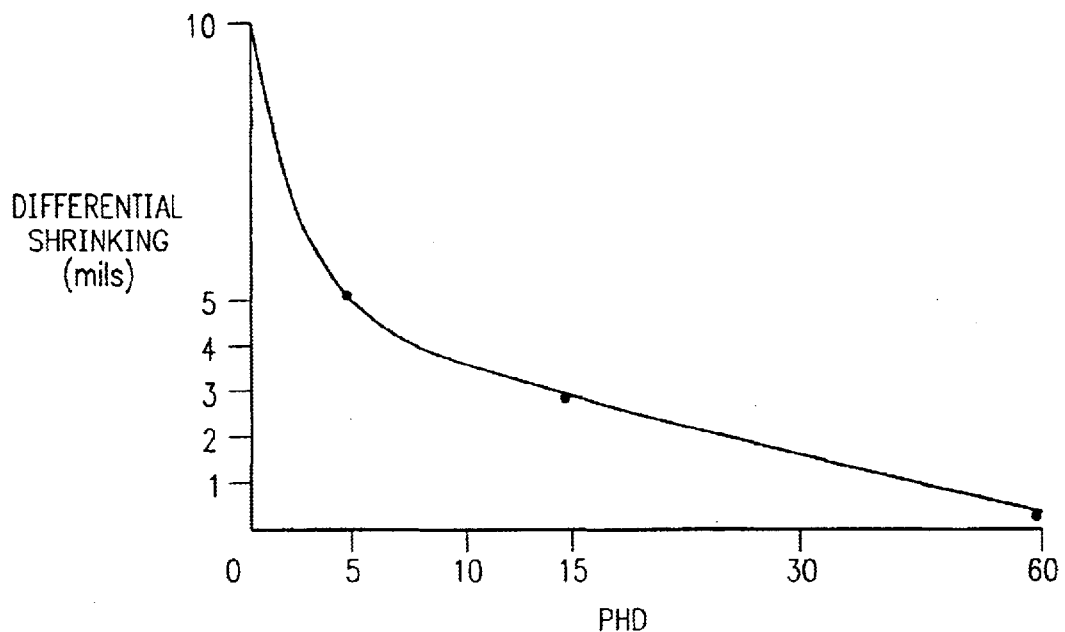
FIG. 1 is a graphical illustration of the decrease in differential shrinkage obtained in parts produced according to the method of the present invention.

The purpose of delaying additional vector scan draws by a laser in stereolithography on the working surface of a photopolymer is to allow a specified amount of time between the drawing final hatch of a three-dimensional object part and the drawing of its true CAD boundary. This delay time permits the interior of the part or component to shrink before drawing the exterior of the part to produce a more accurate part. It has been found with different photopolymer resins that differential shrinkage can be significantly reduced in a particular stereolithographic (SL) system by employing specific delay amounts of time between the final hatch, for example, of a part and the drawing of the part's true CAD boundary. As an example differential shrinkage in a part made in an SLIA 7000 system with a resin formulation comparable to SL 7510 was about 10 mils with no delay time after hatching before the final boundary or border draw representative of the true CAD boundary, about 5 mils with a 5 second delay time period and about 3 mils with a 15 second delay period. Differential shrinkage substantially decreases with longer delay times up to as much as 60 seconds, but the SL system output can be detrimentally affected. Hence, there must be a balancing between acceptable shrinkage and output times. FIG. 1 is a graphical illustration of the decrease in differential shrinkage obtained in parts produced on an SLA 7000 system commercially available from 3D Systems, Inc. of Valencia, Calif. Utilizing the method of the present invention, acceptable shrinkage was deemed to occur with delay times of 15 seconds.

Figure 2:
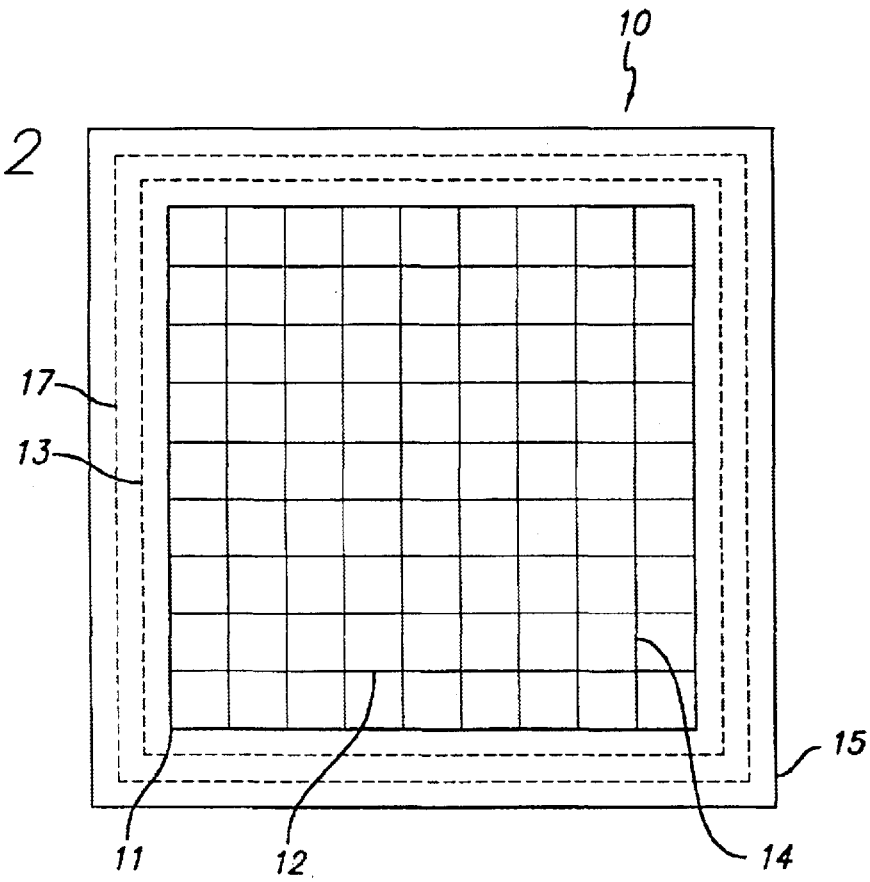
FIG. 2 is a diagrammatic illustration of the vector scan draws showing multiple borders vector draws from the hatch border outwardly to the final border or true CAD boundary.

FIG. 2 depicts the vector scan draws of a part indicated generally by the numeral 10 with multiple borders utilizing the improved drawing order of the present invention. The drawing order of the borders starts from the hatch border (LB) 11 outwardly toward the final border or layer boundary prime (LBP) which is the true CAD boundary of the part being drawn by the SL system from the CAD file data representation of the object. The first vector scan draw is the layer border for hatch (LB) 11. Next the hatch vector scan draws are done using a first pass of a hatch laser scan or draw (LW) 12 and a second pass of a hatch laser scan or draw (LW) 14. FIG. 2 shows the draw of part 10 with the true CAD boundary or layer boundary prime (LBP). After the hatch vector scan draws are done fill vector scan draws for upward facing (UB) or downward facing (DB) vectors can be drawn. Then the multiple border vectors 13 and 17 are drawn moving from the inside of the part outwardly from the LB 11 scan vector draw until the LBP 15 is finally drawn. It has been found that this drawing order minimizes the irregularities in the LBP 15 and appears to improve the elongation at break physical properties of the parts. It is theorized that drawing the vector scan draws in the prior utilized order of hatch border (LB), final border (LBP) and finally the filler borders (LB) caused the LBP to be stressed and pulled inwardly by the shrinkage in the hatch area, causing irregularities that initiate breakage during tensile elongation testing.

Figure 3A:
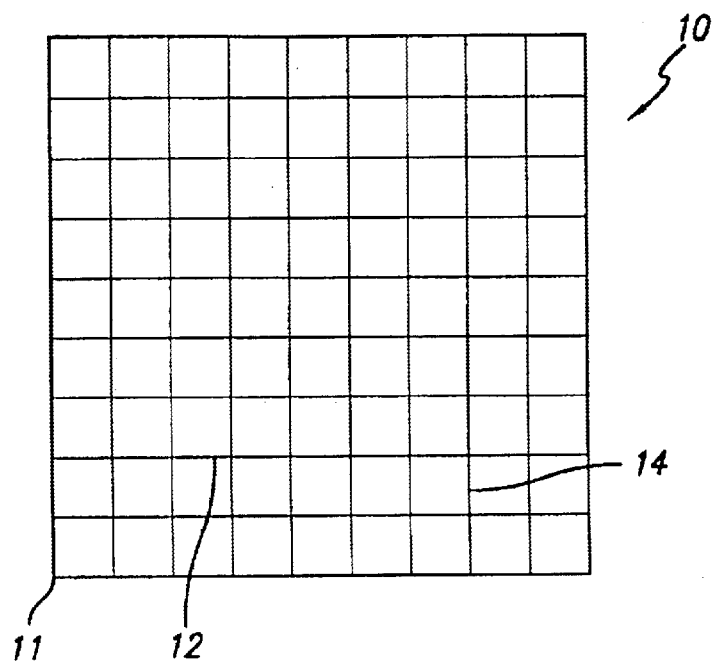
FIGS. 3a and 3b are diagrammatic illustrations of the vector scan draws showing the part layer boundary, internal hatch draws and the true CAD boundary.
Figure 3B:
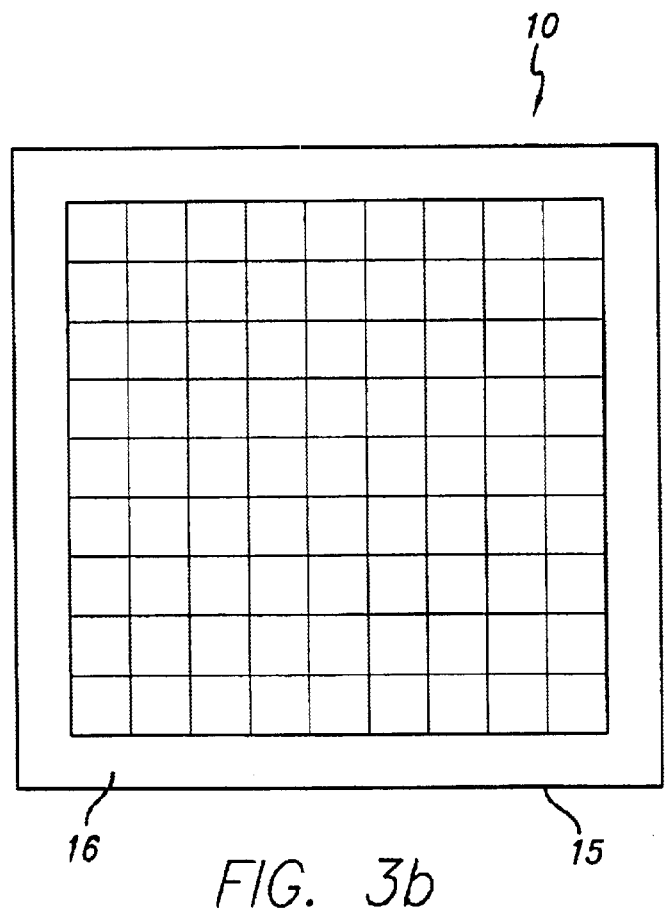

FIG. 3a illustrates a part indicated generally by the numeral 10 with its layer boundary laser scan or draw (LB)11, a first pass of a hatch laser scan or draw (LH) 12 and a second pass of a hatch laser scan or draw (LH) 14. FIG. 3b shows the draw of the part 10 with the true CAD boundary or layer boundary prime (LBP) 15 with the intermediate space 16 between the LB and the LBP representing the delay time between the vector scan draws LB and LBP.

To minimize delay time in a build of a single part or component or with multiple components being built in a stereolithographic system a simple algorithm has been developed. This algorithm, in the case of multiple parts being built in the system, has each component be completed before the next is drawn. When a single component or part 10 is being built on a stereolithography piece of equipment the vector scanning or drawing sequence draws the inner boundary layer vector (LB) and then an Up Boundary vector (UB) or a Down Boundary vector (DB). Then that specific boundary is hatched or filled by a hatch vector (LH) draw or an Up or Down Fill vector (UF or DF). Most hatch styles have at least two hatches. When the last hatch for the last inner boundary type is drawn, the current time ($T_1$) is recorded for that individual part or component. If a part has 3 inner boundary types, for example LB, UB, and DB drawn in that order by the laser scan, then the time will not be recorded until the last hatch or fill vector for the DB is drawn. Supports are then drawn for the part if they exist. After the support vector scans or draws are completed the current time ($T_2$) is compared with the previous time $T_1$ recorded after completion of the hatch vector draws. The system has a programmed delay time after hatching commonly called the post hatch delay time (PHD) which is utilized to permit the curing or cross-linking of the photopolymer resin to complete and reduce the potential for part shrinkage from the originally intended size communicated in the CAD data file. The difference of $T_2-T_1$ is compared to the programmed PHD value and the difference between these values is the amount of time the stereolithographic system will delay before drawing the LBP laser scan. If the time to draw the support vectors is greater than the programmed PHD then the system does not have to delay. Drawing the supports between the last hatch vector draw and the LBP minimizes any delay time required and optimizes the use of the PHD time by concurrently performing the support vector draws.

An additional optimization procedure is employed that automatically decides whether a delay is necessary for a portion of a part being built even though a PHD has been programmed. Since the effective shrinkage of the part is proportional to the size of the interior solid of the part being built, large areas in length having long vector scan draws require more delay time than small areas in length requiring shorter vector scan draws. As a part is built and increases in height the geometry of the part changes such that frequently the cross sectional area being scanned is sufficiently small that no delay is necessary. This is accomplished by having the system process the area being drawn by calculating the length of each hatch (LH) or fill (UF or DF) for that area. If there is a hatch or fill length that is greater than the specified nominal length that is programmed into the software of the system, then a delay time period is employed. If there are no hatch or fill vector lengths greater than the programmed length, then no delay time period is employed. It has been found that a programmed length of 1.0 inches works well. This algorithm permits a dynamic process to be employed so the stereolithographic (SL) system evaluates the part geometry being drawn and optimizes the use of the delay time.

An alternative approach has made use of individual timers for each part or component being drawn when multiple parts are being drawn on a build platform during the same build process. This approach combines the use of timers and the time effective ordering of the vector scan draws to optimize the total output of the SL system. This has been found to be especially effective in an SL system, such as the SLA 7000 system of the assignee of the present invention, where multiple laser beam spot sizes are employed and therefore there is an increased number of boundary types and internal vector scan draws that can be employed. It can be employed where multiple copies of the same .stl file representing one part or multiple .stl files representing multiple parts are being drawn. In this mode each boundary type for all of the components are drawn in a specified order, such as the large spot layer border (LLB), the large spot downfacing border (LDB), the large spot upfacing border (LUB), then the small spot layer border (LB), the small spot downfacing border (DB), the small spot upfacing border (UB), then the support border and finally the layer boundary prime boundary or final borders (LBP). In this method all of the LLB vector scan draws are done first for all components before moving on to the next boundary type. This is a substantial difference from drawing all of the boundary or border types for a single part first and then moving on to the next part. An SLA 7000 system, for example, can employ a large spot size laser beam of about 0.030 inches diameter and a small spot size beam of about 0.010 inches diameter.

Since each individual part or component has its own timer for PHD, the process can be further optimized in a given layer when drawing PHD components or parts and non-PHD components or parts in the same layer. For example, if one part is a PHD part but another is not, by ordering the PHD component first in the vector draw sequence and having an individual timer for the PHD part it is possible to absorb the programmed PHD time when drawing the non-PHD hatch/fill vector and not affect the overall SL system throughput. Further, it is possible to reduce the likelihood of incurring any delay by drawing the support vector scans after the hatching of all components. Additional delay can be avoided by the use of the algorithm's employing the previously discussed area being drawn to determine if it is large enough to employ the programmed PHD. This mechanism permits the mixing of PHD and non-PHD parts or components in a single build on an SL system, and even multiple PHD parts with different PHD values in any combination while maintaining optimum part throughput in the system.

The principle employed in utilizing the improved border scan vector drawing order is to combine efficient use of the delay periods of time after hatching with a stress reducing curing method in each layer or lamina to reduce differential shrinkage. The build material preferably is a photocurable photopolymer resin such as that commercially available from 3D Systems, Inc. in Valencia, Calif., as SL 7540, SL 7520 or SL 7510, although any suitable photopolymer resin may be employed.

It should also be noted that the present invention can be employed with dual spot size laser beam widths or single small spot size laser beam widths. If only a small spot size beam width is employed, the cure is slower to permit chemical reaction from the photopolymerization to occur and still obtain reduced shrinkage. The preferred source of UV light for curing is a laser with a defined beam width or diameter. Suitable lasers include an HeCd laser or preferably a solid state laser. Small spot size exposure can be employed to reduce shrinkage, as discussed previously, and in conjunction with reduced laser power. For example, use of a maximum laser power of 300 mW has proven to significantly reduce differential shrinkage. Use of a small spot size laser beam preferably employs a laser beam width of 12 mil or less and when used in a dual spot size mode of operation employs a large spot size laser beam width of 27 mil. When use of a single spot size laser beam is employed the beam width can be any size greater than 12 mil.

The present method of forming a three-dimensional object obtains solidification of the liquid material in various volumetric percentages in the intermediate layers. The partially cured intermediate layer can be solidified from about 20% to about 80% by volume of the build material, more preferably from about 50% to about 75% by volume of the build material, and most preferably by about 60% to about 75% by volume of the build material during the curing of the partially cured intermediate layer.

While the present invention has been primarily developed to reduce differential shrinkage stereolithographic parts between, it should be noted that the technique can be applied equally well to other technologies forming three-dimensional objects. It could be equally well applied to systems employing photopolymers with any UV curable system. Additionally, while described in the context of liquid photopolymers employed in stereolithographic apparatus, it is possible to employ the invention with other material in other applications. For example, a paste or sinterable material that is curable with UV light may also be appropriately employed. The paste can be a metallic or ceramic material blended with curable liquid.

Accordingly, the spirit and broad scope of the appended claims is intended to embrace all such changes, modifications, and variations that may occur to one of skill in the art upon the reading of the disclosure. All patent applications, patents and other publications cited herein are incorporated by reference in their entirety.

What is claimed is:

1. A method of forming a three-dimensional object part having multiple border exposures in layerwise fashion by selectively solidifying a photocurable build material comprising:
    (a) solidifying a main part area of the three-dimensional object part in a first curable layer build material to form a first cured layer;
    (b) delaying for a desired period of time after solidifying the main part area;
    (c) solidifying borders surrounding the main part area in the first cured layer in multiple boundary drawings from areas closest to the main part area to areas furthest from the main part area to permit the build material to fill shrunken areas to reduce surface anomalies and preserve border integrity and flatness; and
    (d) repeating steps a-c in a second layer of curable build material overlying at least a portion of the first cured layer of build material to form a three-dimensional object part.

2. The method according to claim 1 wherein the solidifying done in the main part area is done with a hatch or fill build style pattern.

3. The method according to claim 1 further comprising using a photopolymer as the photocurable build material.

4. The method according to claim 3 further comprising using UV light to do the curing of the photopolymer.

5. The method according to claim 2 wherein the solidifying done in the main part area with the hatch or fill build style is performed using a laser beam to cure the photocurable liquid.

6. The method according to claim 5 wherein the solidifying done in the main part area with the hatch or fill build style is performed with a large spot size laser beam width and a small spot size laser beam width.

7. The method according to claim 6 wherein the solidifying done in the borders surrounding the main part area is selectively performed with a small spot size laser beam width.

8. The method according to claim 6 further comprising using a laser beam to do the curing of the photopolymer having at least one spot size single beam width.

9. The method according to claim 6 further comprising using a laser beam to do the curing of the photopolymer having a small spot size beam width of about 0.010 inch diameter.

10. The method according to claim 8 further comprising using a laser beam to do the curing of the photopolymer having a large spot size beam width of about 0.03 inch diameter or more.

11. The method according to claim 8 further comprising using a laser beam to do the curing of the photopolymer selectively having a large spot size beam of about 0.030 inch diameter or more and a small spot size beam of about 0.010 inch diameter.

12. The method according to claim 1 further comprising ordering vector draws according to whether a period of delay after drawing is required to reduce part shrinkage and whether no period of delay after drawing is required using a programmed distance of vector draw beyond which a period of delay is automatically performed after vector drawing but below which no period of delay is employed to increase system throughput.

13. The method according to claim 12 further comprising drawing support vector draws concurrently with a period of delay.

14. A method of forming in layerwise fashion three-dimensional object parts having multiple borders in individual layers by selectively solidifying a photocurable build material, the object parts being a plurality of components for which boundary vectors are drawn by scanning with an actinic radiation source, the method comprising:
    (a) solidifying the main part areas of the three-dimensional object parts in a first curable layer of build material to form a first cured layer by drawing the boundary vectors for all components in an ordered fashion defined by drawing all of the boundary vectors for a given component based on a sorting of vector draws requiring a delay being drawn first and drawing vectors not requiring a delay secondly concurrently in a time period during which delay is required for the vectors requiring delay;
    (b) delaying for a desired period of time after solidifying at least one component boundary vector requiring delay while concurrently solidifying component vectors not requiring a delay in the main part area;
    (c) solidifying borders surrounding the main part area in the first cured layer in multiple boundary drawings from areas closest to the main part area to areas furthest from the main part area to permit the build material to fill shrunken areas to reduce surface anomalies and preserve border integrity and flatness; and
    (d) repeating steps a-c in a second layer of curable build material overlying at least a portion of the first cured layer of build material to form a three-dimensional object part.

15. The method according to claim 14 further comprising drawing support vectors for the object parts, the drawing taking a support draw time period that is compared to the desired period of time for delay and if the desired period of time for delay is greater than the support draw time period, then draw the supports concurrently with the desired period of time for delay.

16. The method according to claim 15 further comprising employing a programmed length of time for delay for each layer of the object parts based on a programmed vector draw distance for internal object part draws such that when there are no internal object part draws greater than the programmed vector draw distance, the programmed length of time for delay is not employed.

* * * * *

UNITED STATES PATENT AND TRADEMARK OFFICE
CERTIFICATE OF CORRECTION

PATENT NO. : 6,699,424 B2
DATED : March 2, 2004
INVENTOR(S) : Hop D. Nguyen et al.

It is certified that error appears in the above-identified patent and that said Letters Patent is hereby corrected as shown below:

<u>Column 4,</u>
Line 12, should read -- shrinkage in a part made in an SLA 7000 system with a --.

Signed and Sealed this

Twenty-seventh Day of July, 2004

JON W. DUDAS
*Acting Director of the United States Patent and Trademark Office*